(12) United States Patent
Silverman

(10) Patent No.: US 8,571,967 B1
(45) Date of Patent: *Oct. 29, 2013

(54) SYSTEM AND METHOD FOR ALGORITHMIC TRADING STRATEGIES

(75) Inventor: Andrew F Silverman, Holmdel, NJ (US)

(73) Assignee: Goldman, Sachs & Co., New York, NY (US)

( * ) Notice: Subject to any disclaimer, the term of this patent is extended or adjusted under 35 U.S.C. 154(b) by 553 days.

This patent is subject to a terminal disclaimer.

(21) Appl. No.: 12/782,556

(22) Filed: May 18, 2010

Related U.S. Application Data

(63) Continuation of application No. 11/146,632, filed on Jun. 7, 2005, now Pat. No. 7,747,508.

(60) Provisional application No. 60/577,771, filed on Jun. 7, 2004.

(51) Int. Cl.
*G06Q 40/00* (2012.01)

(52) U.S. Cl.
USPC .......................................................... 705/37

(58) Field of Classification Search
None
See application file for complete search history.

(56) References Cited

U.S. PATENT DOCUMENTS

| | | |
|---|---|---|
| 2002/0138401 A1 | 9/2002 | Allen et al. |
| 2002/0152153 A1 | 10/2002 | Nakagawa |
| 2002/0184237 A1 | 12/2002 | McFeely |
| 2003/0101128 A1 | 5/2003 | Abernethy |
| 2003/0233306 A1* | 12/2003 | Madhavan et al. ............... 705/37 |
| 2004/0024690 A1 | 2/2004 | Satow et al. |
| 2004/0148242 A1 | 7/2004 | Liu |
| 2005/0075965 A1 | 4/2005 | Cutler |
| 2005/0273424 A1* | 12/2005 | Silverman et al. ............... 705/39 |

OTHER PUBLICATIONS

Vieru, M., "Use of different trading envirnment around interim earnings annoucement of the Helsinki stock exchange", Mulitnational Finance Journal, Camden, Sep.-Dec. 2003.*

Otness, E., Balancing the interest of retail and institutional investors: The continued quest for transparency in today's fragmented equity markets, Northwestern University Law review, Chicago: Summer 2002.*

Otness, Eric C., "Balancing the Interests of Retail and Institutional Investors: The Continued Quest for Transparency in Today's Fragmented Equity Markets," Northwestern University Law Review, vol. 96, Issue 4, 21 pages, Summer 2002.

Vieru, Markku, "Use of Different Trading Environments Around Interim Earnings Announcements on the Helsinki Stock Exchange," Multinational Finance Journal, vol. 7, Nos. 3 and 4, pp. 131-152, 2003.

* cited by examiner

*Primary Examiner* — Olabode Akintola

(74) *Attorney, Agent, or Firm* — Perkins Coie LLP

(57) ABSTRACT

Various embodiments of the present invention are directed to systems and methods for algorithmic trading strategies and/or systems and methods for use in executing an order directed to a security traded in a market. More particularly, one embodiment of the present invention relates to a method implemented by a programmed computer system for use in executing an order directed to a security traded in a market, comprising: calculating a plurality of expected market impacts associated with execution of the order over a plurality of different time periods; calculating a plurality of expected price risks associated with execution of the order over the plurality of different time periods; calculating a plurality of expected total costs associated with execution of the order over the plurality of different time periods, wherein the plurality of expected total costs are calculated using the plurality of expected market impacts and the plurality of expected price risks; and trading the security via execution of the order over a time period at which the expected total cost is optimal (e.g., minimized).

11 Claims, 3 Drawing Sheets

SYSTEM AND METHOD FOR ALGORITHMIC TRADING STRATEGIES

RELATED APPLICATIONS

This application is a continuation of and hereby claims priority under 35 U.S.C. 120 to non-provisional U.S. patent application Ser. No. 11/146,632, entitled "System and Method for Algorithmic Trading Strategies," filed on Jun. 7, 2005, which claims the benefit under 35 U.S.C. 119(e) of U.S. Provisional Ser. No. 60/577,771, filed Jun. 7, 2004. The entire contents of the aforementioned applications are herein expressly incorporated by reference.

FIELD OF THE INVENTION

Various embodiments of the present invention are directed to systems and methods for algorithmic trading strategies and/or systems and methods for use in executing an order directed to a security traded in a market.

More particularly, one embodiment of the present invention relates to a method implemented by a programmed computer system for use in executing an order directed to a security traded in a market, comprising: calculating a plurality of expected market impacts associated with execution of the order over a plurality of different time periods; calculating a plurality of expected price risks associated with execution of the order over the plurality of different time periods; calculating a plurality of expected total costs associated with execution of the order over the plurality of different time periods, wherein the plurality of expected total costs are calculated using the plurality of expected market impacts and the plurality of expected price risks; and trading the security via execution of the order over a time period at which the expected total cost is optimal (e.g., minimized).

BACKGROUND OF THE INVENTION

Various stock trading and order execution mechanisms have been proposed. Examples include the mechanisms described in the following patent documents.

United States Patent Application 2005/0075965 relates to a securities market and market maker activity tracking system and method. More particularly, this application relates to a method, system and computer program to monitor securities market activity to seek out imbalances in market activity that could lead to a price change in a particular security. Level 1 and/or level 2 data is analyzed to track the activity of market makers and to derive indicators of momentary upward or downward price pressure. The indicators associated with each selected security can be displayed to a user.

United States Patent Application 2004/0148242 relates to a method and system for intelligent automated security trading via the Internet. More particularly, this application relates to a method and system for intelligent automated security trading via the Internet, which provides an Automated Trading Service Center (ATSC), offering a Home Page Service and managing at least one Virtual Fund Manager (VFM) system. The ATSC is a wireless e-commerce service center providing automated trading services to investors anytime anywhere. By accessing the HPS, the investor can interact with ATSC to develop a custom investment strategy based personal VFM system to automatically trade electronic trading based securities. The VFM is a real time running program incorporated by four engines: the Quote Processing Engine, the Decision Making Engine, the Order Execution Engine, and the Order Processing Engine. Under commands of ATSC server, the VFM can periodically retrieve quotation from the security exchange, monitor the market fluctuation by performing intensive calculations to detect the desired Buy/Sell timing as predetermined by investor's proprietary investment strategy algorithms, and ultimately execute the transaction automatically.

United States Patent Application 2004/0024690 relates to a volume limitation method and system for a real-time computerized stock trading system. More particularly, as provided for in this application a system controls the volume of trading for an individual investor for a given stock and protects against market domination in real-time computerized stock trading systems. These stock trading systems may provide trading environments that do not have sufficient liquidity and may thus be susceptible to market domination due to large trade orders placed typically by large institutions or users with great resources. The system determines a volume limit and rejects or flags new trade orders that make a user's total trading volume for a certain stock exceed the determined volume limit.

United States Patent Application 2003/0101128 relates to a state tracking system for a basket trading system. More particularly, this application relates to a tracking system that includes an order tracking database that stores the status of orders as they are processed within a distributed order fulfillment system that has a number of order execution systems that fill all or part of each order. Each order goes through a number of different transaction stages and the result of each stage is reported as an event to the database. The events are transmitted as messages using an output queue in the order execution system and an event message queue in an event tracking service. The tracking service updates the database when events appear in the event queue. The message processing system operates independently of order processing allowing order processing to continue while the tracking service updates the database. The messages include the components of an asset record of a core system database. The status of any order within the distributed system can be obtained from the database. The system also includes execution confirmation and error tracking with corresponding centralization of this information.

United States Patent Application 2002/0184237 relates to methods and apparatus for compiling, processing and disseminating equity transaction data. More particularly, this application provides a system for distributing data describing trading activity occurring on a plurality of different Electronic Communications Networks (ECNs), each of which receives buy and sell orders from stock traders and each of which performs equity sales transactions based on the received orders. Live data fed from each ECN describing pending buy and sell orders and executed transactions on each exchange are reformatted into standard form and aggregated to create, update and maintain consolidated trading data that is stored in a database. In response to one or more request specifications received from a remotely located user, the system extracts and processes selected portions of the consolidated data to produce response data returned to the requestor. This requested data may include streaming ticker tape and stock status data describing the status of all or a selected subset of stocks being actively traded on the multiple ECNs; an index value representative of the current selling price of a predetermined group of securities being traded on the multiple ECNs, depth-of-book data describing the current best pending offers to buy and sell one or more selected securities, and news stories concerning the securities being traded, including artificially generated natural language text news which is automatically produced by items of consolidated ECN data that satisfies predetermined conditions which define "newsworthy" events.

United States Patent Application 2002/0152153 relates to a securities trading system, computer system, buy/sell order placement method, buy/sell order processing method, and program. More particularly, this application provides a securities trading system including a customer's PC 30 connected to the Internet 10, a securities company's site 20 which is connected to the Internet 10 and processes securities trading orders from the customer's PC 30, and an exchange's computer 50 connected to the securities company's site 20 via a leased line 40, wherein the securities company's site 20 provides information of a group order entry screen for entering an order covering multiple issues and their respective limit prices specified as a group, to the customer's PC 30, and after displaying the group order entry screen information provided by the securities company's site 20 in a browser 31, the customer's PC 30 outputs a group order covering a group of issues for which respective limit prices are specified, through the Internet 10.

United States Patent Application 2002/0138401 relates to a method and system for automatic execution of a securities transaction. More particularly, as provided for in this application a securities transaction, such as a buy or sell order is transmitted to a securities exchange with an indicator requesting automatic execution. In one embodiment, the securities transaction has a limit price and if the limit price is equal to or better than the current quote for the security on the exchange, the transaction is automatically executed without exposing the transaction to the auction market crowd on the exchange floor for possible price improvement. In another embodiment, the securities transaction is a market order, and if otherwise eligible, the transaction is automatically executed without exposing the transaction to auction market crowd on the exchange floor for possible price improvement.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
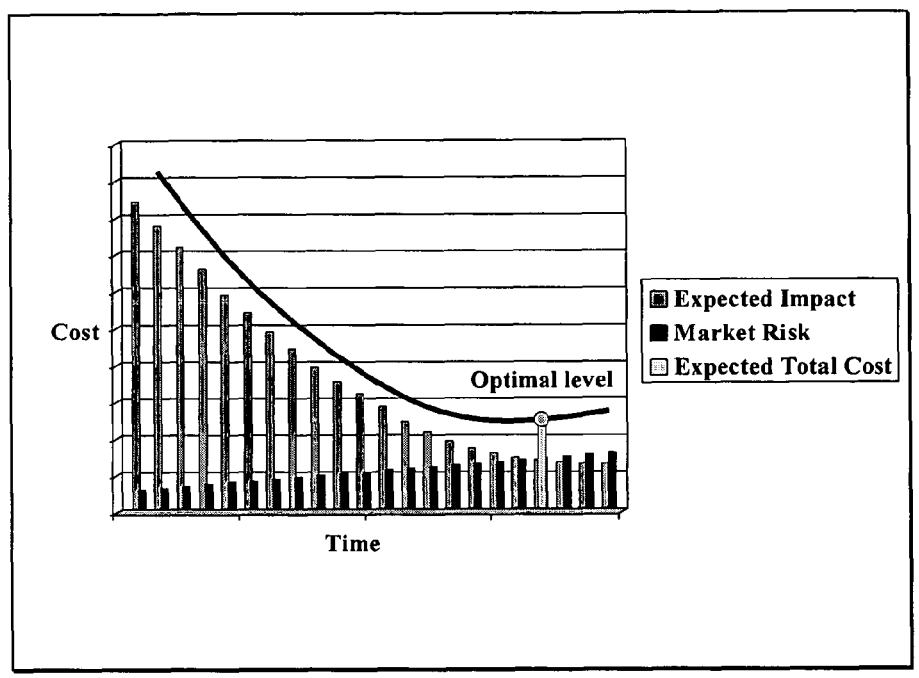
FIG. 1 shows a chart in connection with a first embodiment of the present invention.

Referring now to FIG. 1, a first embodiment of the present invention (hereinafter sometimes referred to as the "expected impact and market risk" embodiment) will be described.

More particularly, this expected impact and market risk embodiment may utilize an algorithm designed to help the user make a quantitative decision regarding execution strategy by optimally balancing expected market impact and market risk (see FIG. 1). In this regard, the impact cost estimates may be generated by various trading cost models. In one example (which example is intended to be illustrative and not restrictive), the cost models may generate cost estimates by taking into account key stock and/or order characteristics, such as (but not limited to): order size; expected volume and spreads over execution horizon; market capitalization; listing venue (e.g., exchange); volatility; and price level. The algorithm may use these costs estimates along with the risk of the stock (e.g., price risk over time) and the user's risk aversion to generate an optimal trading strategy. This strategy may be dynamically adjusted to adapt to changing market dynamics and to deviations from historic patterns.

In another example (which example is intended to be illustrative and not restrictive), relevant trading parameters such as (but not limited to): volatility; spread; market cap; volume; and the user's risk aversion (e.g., measure of perceived strength of alpha/immediacy of execution) may be used by the algorithm to develop the trading strategy.

In another example (which example is intended to be illustrative and not restrictive), the algorithm may have an "aggressive" component and a "defensive" component, which work in tandem to execute the order. The "defensive" component may work the order with volume trying to maximize spread capture, while the "aggressive" component may look for pockets of liquidity at favorable price points (e.g., depending on the risk aversion selected by the user).

In another example (which example is intended to be illustrative and not restrictive), the algorithm may utilize the following:

Size Restriction: No limit (the larger the size, the greater the variability of actual cost relative to benchmark cost estimate).

Minimum Duration: 10 minutes

Optional Parameters: Start time, End time, Price limit, Risk aversion level.

Of note, the algorithm may provide guidance when the user is uncertain about the appropriate trading horizon.

Of further note, specific execution objectives may be achieved with the prudent use of risk aversion. For example:

By selecting a low risk aversion, the user can maximize the spread capture and reduce market impact by working the execution over a longer horizon—but allows for greater price risk. Most effective for less volatile names and/or where the user has no short-term alpha, or for baskets which are dollar neutral.

By selecting a high risk aversion, the algorithm reduces price risk by providing speedier executions, but at the expense of possibly larger market impact. Most effective for volatile stocks and/or where user has a strong short-term alpha.

Figure 2:
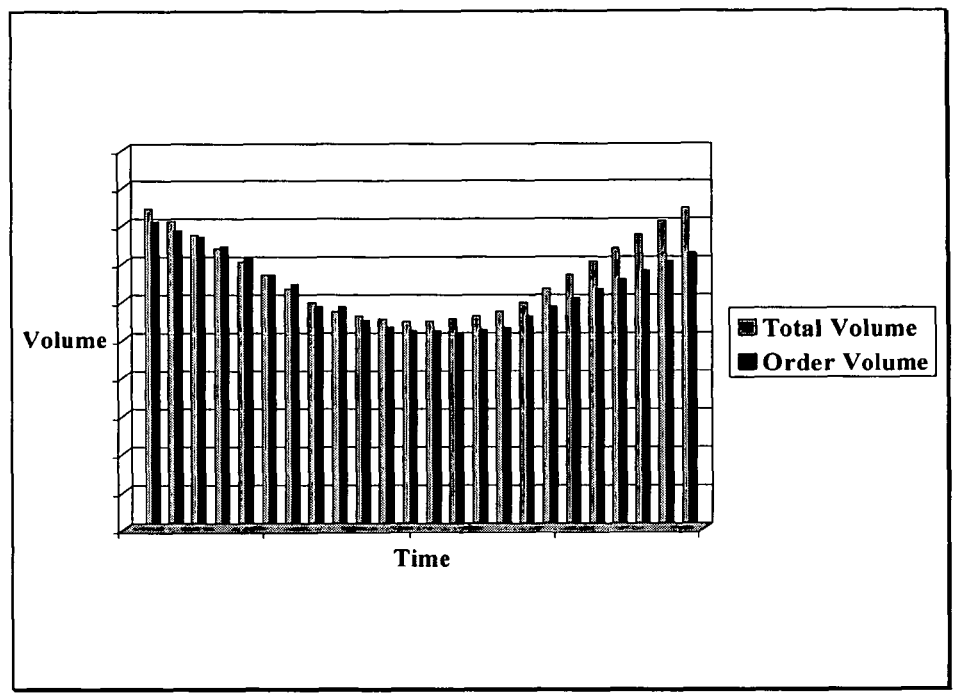
FIG. 2 shows a chart in connection with another embodiment of the present invention.

Referring now to FIG. 2, another embodiment of the present invention (hereinafter sometimes referred to as the "volume-weighted average price" (or "VWAP") embodiment) will be described.

More particularly, this VWAP embodiment may utilize an algorithm designed to provide users with the ability to target an execution to a certain volume-weighted average price (see FIG. 2). For example (which example is intended to be illustrative and not restrictive), the algorithm may take into account user-defined parameters as well as the security's historical trading profile to execute the order. In another example (which example is intended to be illustrative and not restrictive), the algorithm may analyze historical patterns in the stock's trading volumes to determine the optimal execution trajectory for each order. In another example (which example is intended to be illustrative and not restrictive), while the order is alive, users may have the ability to update and/or cancel their order (providing them with a high level of comfort and flexibility when using this order type).

In another example (which example is intended to be illustrative and not restrictive), the algorithm may utilize statistical theoretical values (this may help in maximizing the probability of spread capture within the given constraints).

In another example (which example is intended to be illustrative and not restrictive), the algorithm may have the ability to use short-term technical indicators to make appropriate adjustments to the originally determined trading trajectory.

In another example (which example is intended to be illustrative and not restrictive), the algorithm may allow the users to dynamically change their price limits and/or order size.

In another example (which example is intended to be illustrative and not restrictive), cancellations may be allowed at any time during the working cycle (this may provide the user with flexibility of operation and control—subject, for example, to NYSE, NASDAQ & TSX regulatory requirements).

In another example (which example is intended to be illustrative and not restrictive), the algorithm may utilize the following:
  Duration: Minimum 5 minutes.
  Optional Constraints:
    Start time (defaults to order entry time).
    End time: (defaults to 16:00 EST).
    Price limit
    Volume limit: be no more than a certain percentage of the volume at any time during the execution.

In another example (which example is intended to be illustrative and not restrictive), the algorithm may be used for orders benchmarked to the VWAP since a primary objective of the algorithm may be to minimize deviation from VWAP.

In another example (which example is intended to be illustrative and not restrictive), the algorithm may be effective for sizeable orders that would have significant market impact if executed immediately. In this regard, the algorithm may permit the user to reduce market impact in a low-touch, yet customizable way by spreading orders out over time, trading most at those times of day when volumes have historically been greatest and scaling back during times where volumes have historically been light.

Of note, the performance relative to VWAP may depend on both price and volume volatility (e.g., the greater the volatility, the more likely the order is to deviate from the VWAP, both favorably and unfavorably).

Of further note, even though the algorithm may try to reduce market impact by working the order over time consistent with historical volume patterns, the order may have significant impact if the order is large relative to the stock's volume. The risk of market impact is greatest for less liquid stocks (i.e., those characterized by relatively low trading volume, high spreads, and/or low market capitalizations). In this regard, using price and volume constraints may allow the user to reduce market impact. However using these constraints actively may increase the probability that the order will not be completed by the end time.

Figure 3:
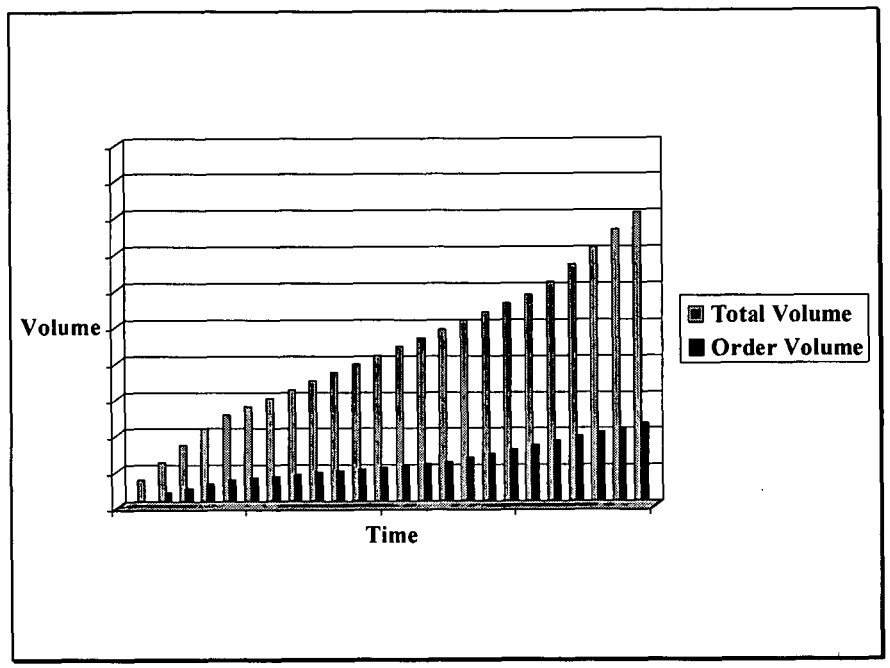
FIG. 3 shows a chart in connection with another embodiment of the present invention.

Referring now to FIG. 3, another embodiment of the present invention (hereinafter sometimes referred to as the "participate" embodiment) will be described.

More particularly, this participate embodiment may utilize an algorithm designed to automate the process of achieving a certain percentage of the market volume. The algorithm may watch and react to real-time stock volume in the market, targeting the specified percentage of volume. The algorithm's ability to adjust its execution strategy to the available liquidity and the user's ability to decide certain parameters may help lead to an optimal outcome.

In one example (which example is intended to be illustrative and not restrictive), the algorithm may monitor market activity (e.g., essentially continuously) to gauge the liquidity in real-time as opposed to estimating it using historical data. This may help the algorithm to stay in-line with the desired level of participation.

In another example (which example is intended to be illustrative and not restrictive), the algorithm may attempt to capture spread by working multiple child orders simultaneously (e.g., with each child order priced at a different price level).

In another example (which example is intended to be illustrative and not restrictive), by using different volume limits, the user may have the option to control the aggressiveness of the execution.

In another example (which example is intended to be illustrative and not restrictive), the algorithm may provide the user with the flexibility to set the following optional parameters:
  Start time and Price limit
  "Ignore Print" feature
    Absolute Print Size—will not respond to trades of a specified size (or larger).
    Average Daily Volume %—will not respond to trades above the specified percentage of average daily volume.

Of note, the present invention may be applied when the user does not want his order to outsize the marketplace (depending on the participation rate and the order size, the order may not necessarily be completed).

Of further note, under the present invention the original order may be split into multiple "child orders". In this regard, the algorithm may revise its trading strategy (e.g., in real-time) with regard to child order placement as child orders are executed and as market conditions change. In one example (which example is intended to be illustrative and not restrictive), some child orders may be sent to the primary market and some may be sent to other destinations (e.g., to access visible and hidden liquidity). See Table 1 below for examples of various destinations (of course, these examples are intended to be illustrative and not restrictive):

TABLE 1

| Listed Destinations | OTC Destinations |
| --- | --- |
| New York Stock Exchange | ArcaEx |
| American Stock Exchange | B-TRADE |
| Toronto Stock Exchange | Brut |
| Arca Exchange | INET |
|  | SuperMontage |

In another embodiment the algorithmic models may derive pricing and/or trading estimates based on historical volume patterns, real-time market data and/or parameters selected by the user. Of course, the ability of the algorithmic models to achieve the performance described herein can be impacted by significant changes in market conditions such as increased volatility, price dislocations, material market events or news or trading halts. In addition, systems or communications failures may impact the ability to access the markets and, consequently, the performance of the algorithmic models. Finally, factors such as order quantity, liquidity, spread size and the parameters selected by the user may impact the performance results.

Of note, the invention may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further, the specific dates, time spans, rates, prices, values and the like described with reference to the various examples are, of course, illustrative and not restrictive. Further still, the invention may encompass a "structure," a "transaction," a "system" and/or a "method". Further still, any actions or steps may be done periodically (wherein the term periodic could refer, for example, to daily, weekly, monthly, quarterly, semiannually, annually or at varying intervals). Further still, the various steps may be carried out in any desired order, one or more steps may be deleted and/or one or more steps may be added.

What is claimed is:

1. A security trading system comprising:
    a memory;
    a processor disposed in communication with said memory, and configured to issue a plurality of processing instructions stored in the memory, wherein the processor issues instructions to:
    receive proposed financial transaction data including a proposed security;
    obtain expected market impact data and expected price risk data associated with execution of a security trade over a plurality of execution times;
    retrieve a trading cost model from a database;
    generate expected total cost data associated with execution of the security trade over the plurality of execution times based on the retrieved trading cost model and the expected market impact data and the expected price risk data;
    obtain a selection of user's risk aversion level;
    determine a trading strategy based on the calculated expected total cost data and the selected user's risk aversion level,
        wherein the selected user's risk aversion level is used to determine an objective of the trading strategy, and wherein the trading strategy optimally balances the expected market impacts and the expected price risks;
    and execute the proposed financial transaction by trading the security based on the determined trading strategy, wherein the trading strategy comprises a first component and a second component executed in tandem, wherein the first component adjusts trade parameters to maximize spread capture, and the second component determines pockets of liquidity at optimal price points.

2. The system of claim 1, wherein the trading strategy includes trading the security at a time instant with which an associated expected total cost is minimized given the selected risk aversion level.

3. The system of claim 1, wherein the trading cost model includes at least one of the following security characteristics: order size, expected volume and spreads over execution horizon, market capitalization, listing venue, volatility and price level.

4. The system of claim 1, wherein determining the trading strategy is further based on at least one of the following trading parameters: volatility, spread, market cap, volume.

5. The system of claim 1, wherein the user's risk aversion level is selected by a user.

6. The system of claim 1, wherein the trading strategy comprises an execution over a long horizon when a low user's risk aversion is selected,
    wherein the objective of the trading strategy under such scenario is to maximize spread capture, reduce market impact and allow for greater price risk.

7. The system of claim 1, wherein the trading strategy provides speedy executions when a high user's risk aversion is selected,
    wherein the objective of the trading strategy under such scenario is to reduce price risk and allow for greater market impact.

8. The system of claim 1, wherein the trading strategy further comprises a size restriction of the security trade, a minimum duration of the security trade and other optional parameters.

9. The system of claim 8, wherein the minimum duration is 10 minutes.

10. The system of claim 8, wherein the other optional parameters include a start time of the trade, the end time of the trade and a price limit.

11. The system of claim 1, wherein the trading strategy is dynamically adjusted and adapted in accordance with changing market dynamics and deviations from historic patterns.

* * * * *